(12) United States Patent
Teague, Jr.

(10) Patent No.: US 8,205,859 B2
(45) Date of Patent: Jun. 26, 2012

(54) EXTENDED VALVE HANDLE

(75) Inventor: Ralph T. Teague, Jr., Monroe, NC (US)

(73) Assignee: Conbraco Industries, Inc., Pageland, SC (US)

( * ) Notice: Subject to any disclaimer, the term of this patent is extended or adjusted under 35 U.S.C. 154(b) by 83 days.

(21) Appl. No.: 12/783,881

(22) Filed: May 20, 2010

(65) Prior Publication Data

US 2010/0294968 A1 Nov. 25, 2010

Related U.S. Application Data

(60) Provisional application No. 61/180,221, filed on May 21, 2009.

(51) Int. Cl.
*F16K 51/00* (2006.01)
(52) U.S. Cl. .... 251/288; 251/293; 251/286; 251/315.01
(58) Field of Classification Search .................. 251/286, 251/315.01, 304, 284, 292, 291, 293, 288
See application file for complete search history.

(56) References Cited

U.S. PATENT DOCUMENTS

| | | | | | |
|---|---|---|---|---|---|
| 4,756,507 | A | * | 7/1988 | McAndrew | 251/292 |
| 4,940,208 | A | * | 7/1990 | Kemp | 251/315.01 |
| 5,236,006 | A | * | 8/1993 | Platusich et al. | 137/375 |
| 5,482,251 | A | * | 1/1996 | Roberts | 251/288 |
| 6,257,551 | B1 | * | 7/2001 | Veiga | 251/288 |

* cited by examiner

*Primary Examiner* — John K Fristoe, Jr.
*Assistant Examiner* — Andrew J Rost
(74) *Attorney, Agent, or Firm* — Shumaker, Loop & Kendrick, LLP

(57) ABSTRACT

A valve handle assembly for a valve having an outwardly extending rotatable stem for opening and closing the valve by rotation of the stem includes a stop plate for engaging the stem, a handle for rotating the stem by engaging and rotating the stop plate, and a cup washer for engaging the handle and retaining the stop plate and handle on the stem upon placing a nut on the stem and tightening of the nut. The handle has an internal lip for retaining the handle and the cup washer has a raised flange for engaging the lip to retain the handle upon tightening of the nut.

16 Claims, 2 Drawing Sheets

EXTENDED VALVE HANDLE

CROSS-REFERENCE TO RELATED APPLICATION

This application claims priority to U.S. Provisional Application No. 61/180,221 filed May 21, 2009 by Teague Jr. and entitled "EXTENDED VALVE HANDLE," the contents of which are incorporated herein by reference.

TECHNICAL FIELD AND BACKGROUND OF THE INVENTION

1. Field of the Invention

The present invention relates generally to a valve handle, and more particularly, to an extended handle for operating an in-line valve installed along an insulated pipe through the insulation without damage thereto.

2. Background of the Invention

A valve placed in the line of an insulated pipe can be hard to reach with conventional handles and familiar tools such as wrenches. Conventional valve stems typically extend only short distances from their valves. Where thick insulation is installed around a valve, a typical valve stem may not extend outwardly from the insulation a great enough distance and so accessing the stem requires either special tools or removal of the insulation around the area of the valve. This represents an inconvenience when a valve is to be opened, closed or adjusted, and may cause a loss of critical time in emergency situations.

Whether routine operations, periodic maintenance or emergency situations are occurring, tampering with the insulation around the valve may require repair and replacement of the insulating material, and may cause a loss of performance in a fluid system due to an unwanted loss or gain of heat through piping material at the area affected by the loss or compromise of the insulating material. Furthermore, compromising the insulation around a valve along a chilled pipe permits the condensation of moisture from the surrounding air and can therefore accelerate the corrosion of the pipe and the valve and can cause degradation of the remaining insulating material due to moisture ingress.

BRIEF SUMMARY OF THE INVENTION

Accordingly, there is a need for an improved handle for a valve that addresses the aforementioned problems. According to at least one embodiment of the invention, a valve handle assembly for a valve having an outwardly extending rotatable stem for opening and closing the valve by rotation of the stem includes a stop plate for engaging the stem, a handle for rotating the stem by engaging and rotating the stop plate, and a cup washer for engaging the handle and retaining the stop plate and handle on the stem upon placing a nut on the stem and tightening of the nut. The handle has an internal lip for retaining the handle and the cup washer has a raised flange for engaging the lip to retain the handle upon tightening of the nut.

In at least one embodiment, the stop plate has a member for positioning within a range between opened and closed positions of the valve defined by limiters extending from the body of the valve.

In at least one embodiment, the stop plate has a rectangular hole formed therethrough for receiving and engaging the stem.

In at least one embodiment, the valve handle assembly further includes a sleeve for positioning around the body of the handle to protect insulation positioned around the valve from being disturbed by the handle upon rotation of the handle to open and close the valve.

According to another embodiment of the invention, a valve handle assembly for a valve having an outwardly extending rotatable stem for opening and closing the valve by rotation of the stem includes a stop plate in a fixed relation to the stem and having a projection extending toward the valve positioned within a rotational range defined between limiters of the valve, a handle having an elongate body in a fixed relationship with the stop plate, the elongate body having a tapered cylindrical shape having a slightly reduced diameter at a near end with respect to the valve and having an inner lip within an interior of the elongate body that abuts against the stop plate and defines a position of the stop plate relative to the handle, a sleeve positioned around the elongate body within which the handle turns, a cup washer having an opening therethrough for receiving the stem and a raised flange that abuts against and retains the inner lip between the stop plate and the raised flange to affix the handle to the valve, and a nut turned on the stem to maintain engagement of the valve handle assembly with the stem.

In at least one embodiment, the valve handle assembly further includes a cap received securely into a far end of the handle apart from the valve to provide a vapor seal against moisture ingress into the interior of the elongate body.

According to another embodiment, the valve handle assembly further includes a valve having a valve body defining an internal bore therethrough and opposing ends terminating in pipe fittings, a plug defining an internal bore therethrough that is disposed in the bore of the valve body that turns about a transverse axis of the valve body such that when the bore of the plug aligns with the bore of the valve body along a longitudinal axis of the valve body the valve is open for a flow of fluid therethrough, and when the bore of the plug is perpendicular to the bore of the valve body and the longitudinal axis of the valve the valve is closed against fluid flow therethrough, a stem by which the plug is rotated within the valve body extending from the valve body along the transverse axis, the stem having external threads for engaging the nut, and limiters extending from the valve body to define a range of motion for the stem.

Additional features, aspects and advantages of the invention are set forth in the detailed description which follows, and in part will be readily apparent to those skilled in the art from that description or recognized by practicing the invention as described herein.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

The present invention will now be described more fully hereinafter with reference to the accompanying drawing in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention.

Figure 1:
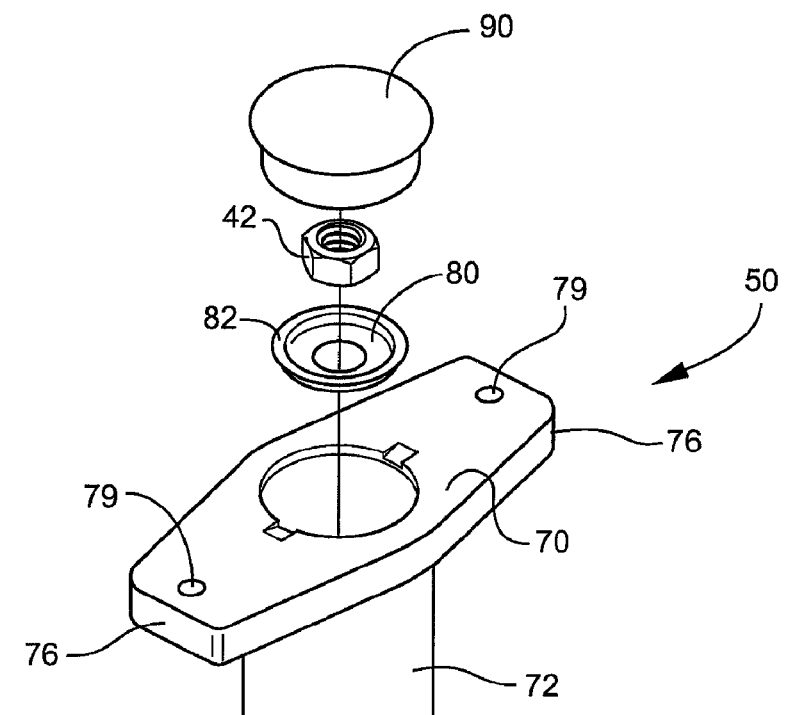
FIG. 1 is an exploded perspective view of a valve handle according to at least one embodiment of the present invention.
Figure 1:
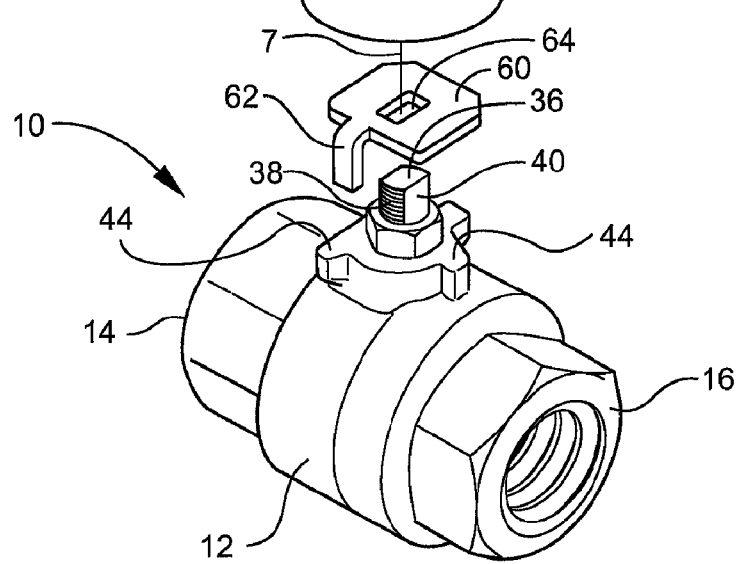
Figure 2:
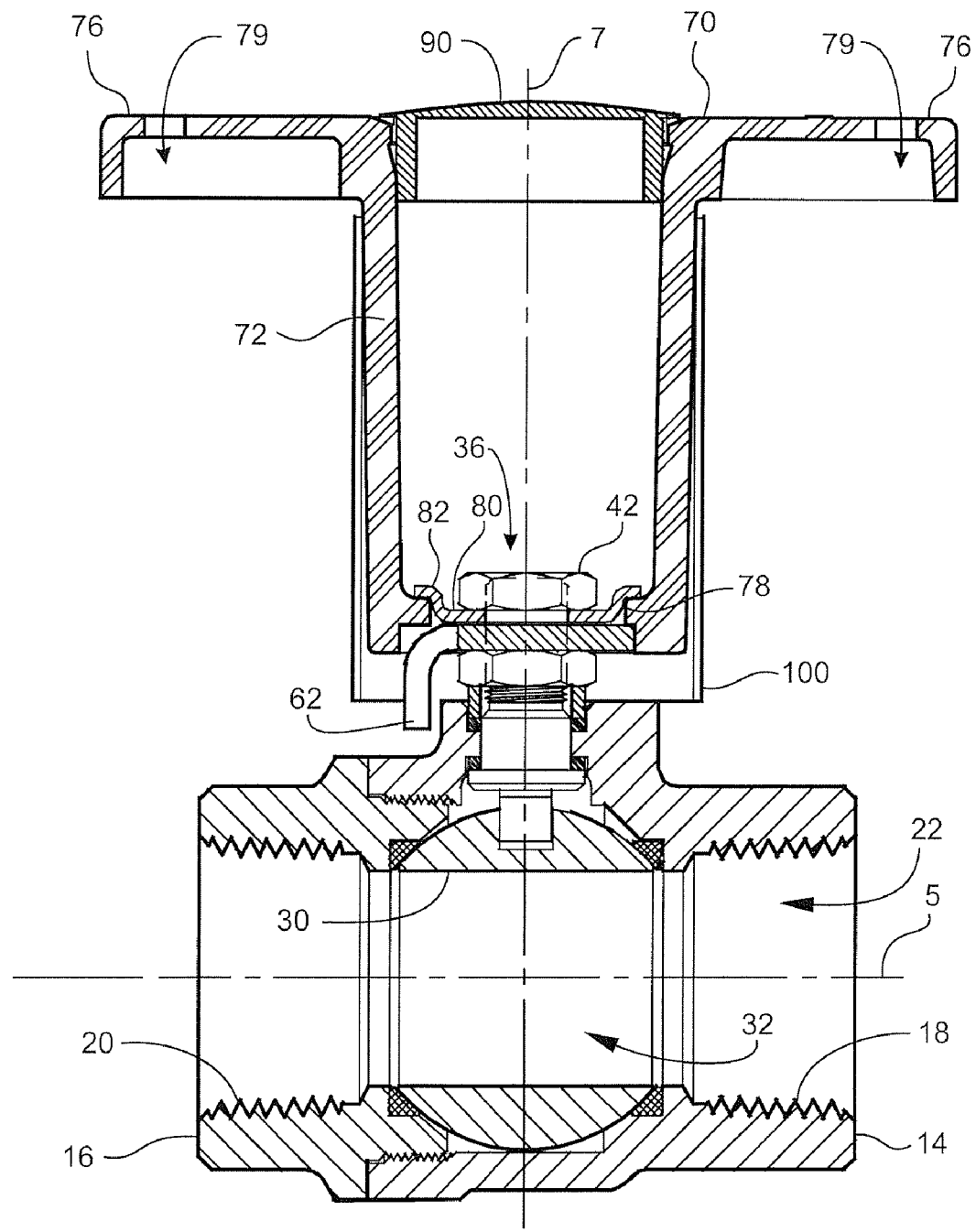
FIG. 2 is a cross-sectional elevation view showing the valve handle of FIG. 1 in an assembled configuration.

Referring to the drawings, wherein identical reference numerals denote the same elements throughout the various views, FIGS. 1 and 2 illustrate a valve 10 and a valve handle assembly 50 according to at least one embodiment of the present invention. The valve 10 includes an approximately cylindrical body 12 having opposing ends 14 and 16 along the longitudinal axis 5 that are formed as fittings to be joined to respective pipe portions with the valve 10 positioned along a line of fluid flow. The body 12 is illustrated to have hexagonal outer surfaces at the opposing ends 14 and 16 and internal threads 18 and 20 to facilitate the joining of the ends to respective ends of pipe segments having external threads corresponding to the internal threads 18 and 20.

Within the body 12, a bore 22 is formed along the longitudinal axis 5, and a spherical plug 30 having an internal bore 32 turns about a transverse axis 7. When the bore 32 of the spherical plug 30 aligns with the bore 22 of the valve body 12 along the longitudinal axis 5 as shown in FIG. 2, the valve is 'open' for the flow of fluid therethrough along the longitudinal axis 5. When the bore 32 of the spherical plug 30 is placed perpendicular to the bore 22 of the valve body 12 and the longitudinal axis 5, the valve 10 is 'closed' against flow therethrough.

As shown in FIG. 1, a stem 36 by which the spherical plug 30 is rotated within the valve body 12 extends from the valve body 12 along transverse axis 7. The stem 36 is typically rotated 90 degrees between the open and closed positions of the spherical plug 30. The stem 36 has external threads 38 for engaging a nut 42 that maintains the engagement of the valve handle assembly 50 with the stem 36 so that the valve 10 can be opened and closed by turning of the valve handle assembly 50. The stem 36 also has opposing planar engagement surfaces 40 facing outward to engage the stop plate 60 as described in the following. Limiters 44 extend from the valve body 12 to define a range of motion for the stem 36 by engaging the stop plate 60 as described in the following.

The valve handle assembly 50 includes a stop plate 60, a handle 70, a cup washer 80, a cap 90, and a sleeve 100. The stop plate 60 has a projection 62 extending in a downward direction toward the valve 10 that is positioned within the range defined between the limiters 44 that extend from the valve body 12. As shown, the limiter-contacting portion of the projection 62 is oriented about perpendicular to the planar portion of the stop plate 60. A rectangular slot 64, which is formed through the stop plate 60, receives the stem 36 and engages the surfaces 40 thereof to maintain a fixed relationship between the stem 36 and the stop plate 60. The stop plate 60 thereby restrains the stem 36 to move between the open and closed positions of the valve 10 as the projection 62 moves between the limiters 44 upon manual turning of the valve handle assembly 50 relative to the valve 10. The stop plate 60 may be formed, for example, of zinc-plated steel to provide durability through multiple uses and to minimize corrosion as exposure to moisture may occur.

The specific dimensions and shape of the stop plate 60 may be varied according to various embodiments of the invention. Various valve types, of which the illustrated valve 10 is only a representative example, can therefore be accommodated by variations in the stop plate 60 while the remainder of the valve handle assembly 50 remains unchanged. Thus, a technician installing such valve handle assemblies might carry a supply of identical handles 70, cup washers 80, caps 90 and sleeves 100 with a variety of stop plate 60 sizes and types. Thus, routine installation and maintenance are made convenient and cost efficient while a variety of valve types are accomodated.

Referring to the handle assembly 50, the handle 70 has an elongate body 72 with recesses 74 that clear the projection 62 and receive and engage the stop plate 60 thereby maintaining the handle 70 and stop plate 60, along with the stem 36, in a fixed relationship as turning of the valve handle assembly 50 occurs and the valve 10 is thereby opened and closed. The handle 70 has extensions 76 forming a tee-handle configuration at the far end of the elongate body 72 with respect to the valve 10. In a preferred construction and instillation, the extensions 76 are aligned with the longitudinal axis 5 when the valve 10 is open for flow as shown in FIG. 2, and are positioned at 90 degrees with respect to the longitudinal axis 5 when the valve 10 is closed as represented in FIG. 1. Thus the positions of the extensions 76 conveniently confirm the state of the valve 10.

Referring to FIG. 2, the elongate body 72 is illustrated as having a tapered cylindrical shape having a slightly reduced diameter at the near end with respect to the valve 10. An inner lip 78 within the interior of the elongate body 72 abuts the stop plate 60 and defines the position of the stop plate 60 relative to the handle 70. Holes 79 are formed through the extensions 76 to permit identifying or informational tags to be tied or attached to the handle 70. In an exemplary embodiment, the length of the handle 70 from the near end to the far end with respect to the valve 10 is approximately 2 inches, although it is envisioned that this length may vary depending upon the installation environment and valve depth within its insulating covering. This extended length permits its use when a thick layer of insulation surrounds a pipe along which the valve 10 is installed. The handle 70 may be formed, for example, as an integrally formed single piece of continuous material such as glass-reinforced nylon.

The valve handle assembly 50 further includes a cylindrical sleeve 100 positioned around the elongate body 72 to prevent wear to surrounding insulation material when the handle 70 is turned. In use of the valve handle assembly 50 with an insulated pipe, the sleeve 100 may be secured to piping insulation and the handle 70 can then be turned without disturbing the insulation as the elongate body 72 turns freely within the sleeve 100. The sleeve 100 protects piping insulation from wear by rotation of the handle 70 and from moisture ingress around the handle 70. The sleeve 100 may be formed, for example, of clear CAB plastic. In a preferred embodiment, the sleeve 100 has a length corresponding to the length of the elongate body 72, such that essentially the entire length of the handle minus the tee-handle gripping portion in encased within the sleeve 100.

The valve handle assembly 50 is installed onto the valve 10 by passing the stem 36 through the stop plate 60, the inner lip 78 of the handle 70, and the cup washer 80, after which the nut 42 is turned on the stem 36 to engage the threads 38 thereof. The inner lip 78 is then retained between the stop plate 60 and a raised flange 82 of the cup washer 80 and thus the handle 70 is affixed to the valve 10. The cup washer 80 may be formed, for example, of zinc-plated steel to provide durability through multiple uses and to minimize corrosion as exposure to moisture may occur.

Once the handle assembly 50 is installed, the cap 90 snaps securely into the far end of the handle 70 apart from the valve 10 and provides a vapor seal against outside air to prevent moisture from entering the elongate body 70. Thus, the cap 90 prevents, for example, water condensation from reaching a chilled pipe through the handle 70. The cap 90 and the cup washer 80 close the interior of the elongate body 70 to prevent moisture migration and to trap a volume of air that provides thermal insulation between the valve 10 and the surrounding environment. Advantageously, essentially all of the volume defined by the interior of the elongate body 70 is filled with insulating air without the need to manufacture and install an insulating plug of foam or other material. The cap 90 may be formed, for example, of heat-stabilized nylon.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A valve handle assembly for a valve having an outwardly extending rotatable stem for opening and closing the valve by rotation of the stem, the valve handle assembly comprising:
    a stop plate having a projection extending toward the valve and positioned within a rotational range defined between limiters of the valve, the stop plate having a slot formed therethrough for receiving a stem of the valve and engaging surfaces thereof to maintain a fixed relationship between the stem and the stop plate;
    a handle having an elongate body and a recess for clearing the projection and engaging the stop plate to maintain the handle and the stop plate, along with the stem, in a fixed relationship as turning of the valve handle assembly occurs, the elongate body further having a tapered cylindrical shape having a slightly reduced diameter at a near end with respect to the valve and having an inner lip within an interior of the elongate body that abuts against a surface of the stop plate facing outward with respect to the valve and defines a position of the stop plate relative to the handle;
    a sleeve positioned around the elongate body within which the handle turns;
    a cup washer having an opening therethrough for receiving the stem, a raised annular flange that abuts against and retains the inner lip between the stop plate and the raised flange to affix the handle to the valve, and a cup bottom that abuts against the surface of the stop plate facing outward with respect to the valve; and
    a nut turned on the stem to maintain engagement of the valve handle assembly with the stem.

2. The valve handle assembly in accordance with claim 1, further comprising a cap received securely into a far end of the handle apart from the valve to provide a vapor seal against moisture ingress into the interior of the elongate body.

3. The valve handle assembly in accordance with claim 1, wherein the valve comprises:
    a valve body defining an internal bore therethrough and opposing ends terminating in pipe fittings;
    a plug defining an internal bore therethrough that is disposed in the bore of the valve body that turns about a transverse axis of the valve body such that when the bore of the plug aligns with the bore of the valve body along a longitudinal axis of the valve body the valve is open for a flow of fluid therethrough, and when the bore of the plug is perpendicular to the bore of the valve body and the longitudinal axis of the valve the valve is closed against fluid flow therethrough;
    the stem by which the plug is rotated within the valve body extending from the valve body along the transverse axis, the stem having external threads for engaging the nut; and
    limiters extending from the valve body to define a range of motion for the stem.

4. The valve handle assembly in accordance with claim 3, the stem further having opposing planar engagement surfaces facing outward to engage the stop plate.

5. The valve handle assembly in accordance with claim 1, wherein the slot of the stop plate is a rectangular hole formed therethrough.

6. The valve handle assembly in accordance with claim 1, wherein the projection is oriented about perpendicular to the stop plate.

7. The valve handle assembly in accordance with claim 1, wherein the elongate body has a length of at least about 2 inches.

8. The valve handle assembly in accordance with claim 1, wherein the sleeve has a length corresponding to a length of the elongate body.

9. A valve handle assembly for a valve having an outwardly extending rotatable stem for opening and closing the valve by rotation of the stem, the valve handle assembly comprising:
    a stop plate engaging the stem, the stop plate having a projection extending therefrom that operates within a rotational range defined between limiters of the valve;
    a handle having an elongate body engaging the stop plate operable for rotating the stop plate, the elongate body having an internal lip within an interior of the elongate body that abuts against a surface of the stop plate facing outward with respect to the valve and defines a position of the stop plate relative to the handle;
    a cup washer having a raised annular flange engaging the inner lip and retaining the stop plate and handle on the stem by a nut tightened on the stem, and a cup bottom that abuts against the surface of the stop plate facing outward with respect to the valve; and
    a sleeve positioned around the elongate body within which the handle turns to operate the valve.

10. The valve handle assembly in accordance with claim 9, wherein the stop plate has a rectangular hole formed therethrough for receiving and engaging the stem.

11. The valve handle assembly in accordance with claim 9, further comprising a cap received securely into a far end of the handle apart from the valve to provide a vapor seal against moisture ingress into the interior of the elongate body.

12. The valve handle assembly in accordance with claim 9, wherein the valve comprises:
    a valve body defining an internal bore therethrough defining a fluid flow path;
    a plug defining an internal bore therethrough that is disposed in the bore of the valve body that turns about a transverse axis of the valve body such that when the bore of the plug aligns with the bore of the valve body along a longitudinal axis of the valve body the valve is open for a flow of fluid therethrough, and when the bore of the plug is perpendicular to the bore of the valve body and the longitudinal axis of the valve the valve is closed against fluid flow therethrough;
    the stem by which the plug is rotated within the valve body extending from the valve body along the transverse axis, the stem having external threads for engaging the nut; and
    limiters extending from the valve body to define a range of motion for the stem.

13. The valve handle assembly in accordance with claim 12, the stein further having opposing planar engagement surfaces facing outward to engage the stop plate.

14. The valve handle assembly in accordance with claim 9, wherein the projection is oriented about perpendicular to the stop plate.

15. The valve handle assembly in accordance with claim 9, wherein the elongate body has a length of at least about 2 inches.

16. The valve handle assembly in accordance with claim 9, wherein the sleeve has a length corresponding to a length of the elongate body.

* * * * *